(12) United States Patent
Tene et al.

(10) Patent No.: US 11,029,930 B2
(45) Date of Patent: *Jun. 8, 2021

(54) CODE OPTIMIZATION CONVERSATIONS FOR CONNECTED MANAGED RUNTIME ENVIRONMENTS

(71) Applicant: Azul Systems, Inc., Sunnyvale, CA (US)

(72) Inventors: Gil Tene, Palo Alto, CA (US); Philip Reames, Irvine, CA (US)

(73) Assignee: Azul Systems, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/710,790

(22) Filed: Dec. 11, 2019

(65) Prior Publication Data
US 2020/0117433 A1    Apr. 16, 2020

Related U.S. Application Data

(63) Continuation of application No. 16/004,236, filed on Jun. 8, 2018, now Pat. No. 10,552,130.
(Continued)

(51) Int. Cl.
*G06F 9/44* (2018.01)
*G06F 9/46* (2006.01)
(Continued)

(52) U.S. Cl.
CPC ............ *G06F 8/4441* (2013.01); *G06F 8/447* (2013.01); *G06F 8/71* (2013.01); *G06F 8/75* (2013.01);
(Continued)

(58) Field of Classification Search
CPC ............... G06F 9/4552; G06F 9/30058; G06F 9/45525; G06F 9/467; G06F 9/3004;
(Continued)

(56) References Cited

U.S. PATENT DOCUMENTS 6,032,244 A     2/2000 Moudgill
6,292,938 B1 *  9/2001 Sarkar ....................... G06F 8/47
                                                   717/138
(Continued)

OTHER PUBLICATIONS

Ilhyun Kim et al., Understanding Scheduling Replay Schemes, 2004, [Retrieved on Jan. 18, 2021], Retrieved from the internet: <URL: https://ieeexplore.ieee.org/stamp/stamp.jsp?tp=&arnumber=1410077> 12 Pages (1-12) (Year: 2004).*
(Continued)

*Primary Examiner* — Anibal Rivera
(74) *Attorney, Agent, or Firm* — Van Pelt, Yi & James LLP

(57) ABSTRACT

A method of providing by a code optimization service an optimized version of a code unit to a managed runtime environment is disclosed. Information related to one or more runtime conditions associated with the managed runtime environment that is executing in a different process than that of the code optimization service is obtained, wherein the one or more runtime conditions are subject to change during the execution of the code unit. The optimized version of the code unit and a corresponding set of one or more speculative assumptions are provided to the managed runtime environment, wherein the optimized version of the code unit produces the same logical results as the code unit unless at least one of the set of one or more speculative assumptions is not true, wherein the set of one or more speculative assumptions are based on the information related to the one or more runtime conditions.

21 Claims, 10 Drawing Sheets

Related U.S. Application Data

(60) Provisional application No. 62/517,661, filed on Jun. 9, 2017.

(51) Int. Cl.

| | | |
|---|---|---|
| *G06F 8/41* | (2018.01) | |
| *G06F 8/71* | (2018.01) | |
| *G06F 8/75* | (2018.01) | |
| *G06F 11/36* | (2006.01) | |
| *G06F 9/30* | (2018.01) | |
| *G06F 9/455* | (2018.01) | |

(52) U.S. Cl.
CPC .......... *G06F 11/3612* (2013.01); *G06F 8/427* (2013.01); *G06F 8/443* (2013.01); *G06F 8/4434* (2013.01); *G06F 9/30047* (2013.01); *G06F 9/30072* (2013.01); *G06F 9/4552* (2013.01); *G06F 9/467* (2013.01)

(58) Field of Classification Search
CPC .. G06F 9/30047; G06F 9/30072; G06F 21/54; G06F 8/4443; G06F 8/70; G06F 8/4441; G06F 8/71; G06F 8/75; G06F 8/427; G06F 8/443; G06F 8/4434; G06F 8/447; G06F 8/47; G06F 11/3612
See application file for complete search history.

(56) References Cited

U.S. PATENT DOCUMENTS

| | | | |
|---|---|---|---|
| 6,658,578 B1 | 12/2003 | Laurenti | |
| 7,178,138 B2 | 2/2007 | Kuzemchak | |
| 7,661,098 B2 | 2/2010 | Sheikh | |
| 8,127,280 B2 | 2/2012 | Thomas | |
| 8,332,833 B2 | 12/2012 | Archambault | |
| 8,359,286 B1 | 1/2013 | Nering | |
| 9,146,759 B2 | 9/2015 | Porras | |
| 9,170,812 B2* | 10/2015 | Vorbach | G06F 9/30047 |
| 9,195,486 B2* | 11/2015 | Porras | G06F 9/45525 |
| 9,311,087 B2 | 4/2016 | Scalabrino | |
| 2002/0038301 A1 | 3/2002 | Aridor | |
| 2002/0095666 A1 | 7/2002 | Tabata | |
| 2002/0184613 A1 | 12/2002 | Kuzemchak | |
| 2003/0018960 A1 | 1/2003 | Hacking | |
| 2003/0037107 A1 | 2/2003 | Maeda | |
| 2005/0071831 A1 | 3/2005 | Sheikh | |
| 2008/0016507 A1* | 1/2008 | Thomas | G06F 11/3612 718/100 |
| 2008/0127151 A1 | 5/2008 | Kawahito | |
| 2008/0301656 A1 | 12/2008 | Archambault | |
| 2010/0199257 A1 | 8/2010 | Biggerstaff | |
| 2011/0191760 A1 | 8/2011 | Guy | |
| 2011/0231813 A1* | 9/2011 | Seo | G06F 8/443 717/106 |
| 2012/0030653 A1* | 2/2012 | Porras | G06F 9/45525 717/124 |
| 2012/0030659 A1* | 2/2012 | Porras | G06F 8/4443 717/151 |
| 2012/0030661 A1* | 2/2012 | Porras | G06F 9/45525 717/153 |
| 2012/0167068 A1 | 6/2012 | Lin | |
| 2012/0227045 A1* | 9/2012 | Knauth | G06F 9/3004 718/100 |
| 2013/0031536 A1* | 1/2013 | De | G06F 9/4552 717/146 |
| 2013/0125097 A1* | 5/2013 | Ebcioglu | G06F 12/0875 717/136 |
| 2014/0165047 A1* | 6/2014 | Lethin | G06F 8/443 717/151 |
| 2014/0282451 A1* | 9/2014 | Vicente | G06F 9/4552 717/151 |
| 2014/0325493 A1 | 10/2014 | Stoodley | |
| 2015/0186786 A1 | 7/2015 | Goyal | |
| 2015/0220845 A1 | 8/2015 | Goyal | |
| 2015/0277872 A1 | 10/2015 | Gschwind | |
| 2015/0356294 A1* | 12/2015 | Tan | G06F 21/54 726/22 |
| 2015/0370560 A1* | 12/2015 | Tan | G06F 9/30058 717/148 |
| 2016/0162406 A1 | 6/2016 | Latorre | |
| 2016/0267000 A1* | 9/2016 | Rose | G06F 9/528 |
| 2018/0060048 A1* | 3/2018 | Gampe | G06F 9/4552 |

OTHER PUBLICATIONS

Edmund B. Nightingale et al., Speculative Execution in a Distributed File System, Oct. 23-26, 2005, [Retrieved on Jan. 18, 2021], Retrieved from the internet: <URL: https://dl.acm.org/doi/pdf/10.1145/1095809.1095829> 15 Pages (191-205) (Year: 2005).*

Cai et al., "Optimal and efficient speculation-based partial redundancy elimination", Mar. 23-26, 2003, [Retrieved on Sep. 18, 2019]. Retrieved from the internet: <URL: https://dl.acm.org/citation.cfm?id=776271 > 12 Pages (91-102) (Year: 2003).

Yiapanis et al., "Optimizing software runtime systems for speculative parallelization", Jan. 2013, [Retrieved on Sep. 18, 2019]. Retrieved from the internet: <URL: https://dl.acm./citation.cfm?id=2400698> 27 Pages (1-27) (Year: 2013).

Bera et al., "Sista: Saving Optimized Code in Snapshots for Fast Start-Up", ManLang 2017: Proceedings of the 14th International Conference on Managed Languages and Runtimes, Sep. 2017, pp. 1-11.

* cited by examiner

Original Function foo() Before Speculative Optimization
310

```
public void foo() { if (var1 < 5) {
        statement1
    } else {
        statement2
        statement3
        statement4
    }
        statement5

}
```

Optimized Version of foo() After Speculative Optimization
320

```
public void foo() { statement1
    statement5
}
```

FIG. 3

```
public class animal
{
    // Instance Variables
    String name;
    String color;

// Constructor Declaration
    // of Class here
    public Animal (String name,
                   String color)
    {
        this.name = name;
        this.color = color;
    }

// the animal class has two methods
    // method 1
    public String getName()
    {
        return name;
    }

// method 2
    public String getColor()
    {
        return color;
    }
}
```
410

```
public class rhino extends animal {
    // the Rhino subclass adds one field
    public int numHorns;

// the Rhino subclass has one constructor
    public rhino (int initNumRhinoHorns,
                  String name,
                  String color) {
        super(name, color);
        numHorns = initNumHorns ;
    }

//the Rhino subclass adds one new methods
    public void setNumHorns (int newValue) {
        numHorns = newValue;
    }
}
```
420

```
public class elephant extends animal {
    //the Elephantsubclass adds one field
    public int numTusks;

// Elephant subclass has one constructor
    public elephant (int initNumTusks,
                     String name,
                     String color) {
        super (name, color) ;
        numTusks = initNumTusks;
    }

//Elephant subclass adds one new methods
    public void setNumTusks (int newValue) {
        numTusks = newValue;
    }
}
```
430

FIG. 4

Original Function foo() Before Speculative Optimization
510

```
public void foo() {
    •
    •
    •
    C = animal.getColor();
    •
    •
    •
}
```

Optimized Version of foo() After Speculative Optimization
520

```
public void foo() {
    •
    •
    •
    C = animal.color;
    •
    •
    •
}
```

FIG. 5

```
                                                                    ┌─610
public class chameleon extends Animal {
    //the Rhino subclass adds one field
    String surroundingColor;

//the chameleon subclass's additional fields here
    //the chameleon subclass has one constructor here
    //the chameleon subclass's additional new methods here // method Y
    public String getColor()
    {
        return surroundingColor;
    }
}
```

FIG. 6

| Orginal Function foo() Before Speculative Optimization | 1st Version of Optimized Code of foo() | 2nd Version of Optimized Code of foo() |
|---|---|---|
| 1010 | 1020 | 1030 |
| ```
public void foo() {
  if (var1 < 5) {
    statement1
  } else {
    statement2
    statement3
    statement4
  }
  statement5
  if (language == "English") {
    statement6
  } else {
    statement7
    statement8
  }
}
``` | ```
public void foo() {
  statement1
  statement5
  if (language == "English") {
    statement6
  } else {
    statement7
    statement8
  }
}
``` | ```
public void foo() {
  statement1
  statement5
  statement6
}
``` |

FIG. 10

CODE OPTIMIZATION CONVERSATIONS FOR CONNECTED MANAGED RUNTIME ENVIRONMENTS

CROSS REFERENCE TO OTHER APPLICATIONS

This application claims is a continuation of U.S. patent application Ser. No. 16/004,236 entitled CODE OPTIMIZATION CONVERSATIONS FOR CONNECTED MANAGED RUNTIME ENVIRONMENTS filed Jun. 8, 2018, now U.S. Pat. No. 10,552,130, which claims priority to U.S. Provisional Patent Application No. 62/517,661 entitled CONNECTED RUNTIMES filed Jun. 9, 2017, both of which are incorporated herein by reference for all purposes.

BACKGROUND OF THE INVENTION

A managed runtime environment (MRTE), also referred to as a dynamic runtime environment, is a virtual execution environment in which code executes. A managed runtime environment abstracts away the specifics of the operating system and the architecture running beneath it by providing a virtual execution environment. It provides different management functions, including dynamic compilation of programs to the underlying native machine format, adaptive code optimization, memory management, code management, dynamic type resolution, security, class loading, garbage collection, and the like. Because of the widespread use of MRTEs, improved techniques for MRTEs are desirable.

Traditionally, a managed runtime environment is isolated and local to a specific device or platform. An instance of a managed runtime environment on one device does not have the capabilities to communicate or connect to an instance of a managed runtime environment that is situated on another device. In providing the various management functionalities described above, such as adaptive code optimization, a standalone managed runtime environment is self-contained and self-reliant. A standalone managed runtime environment utilizes only resources that are local to the device; for example, a standalone managed runtime environment may only utilize the computational power, data storage, and analytical capabilities that are local to the device. Therefore, the performance or capabilities of the standalone managed runtime environment are limited to what the local resources could handle.

BRIEF DESCRIPTION OF THE DRAWINGS

Various embodiments of the invention are disclosed in the following detailed description and the accompanying drawings.

FIG. 3 illustrates one example of speculative optimization of a code unit that may be performed by the code optimizer 114 of the first connected MRTE 112.

FIG. 4 illustrates the declaration of animal and the declarations of the subclasses of the class animal.

FIG. 5 illustrates the code unit foo( ) before and after optimization is performed by the code optimizer 114.

FIG. 6 illustrates one example of when the speculative assumption associated with the modified function foo( ) 520 is violated.

FIG. 10 illustrates one example of a code unit and different versions of optimized code that are derived respectively at the different stages of the code optimization conversation 900 as shown in FIG. 9.

DETAILED DESCRIPTION

Figure 1:
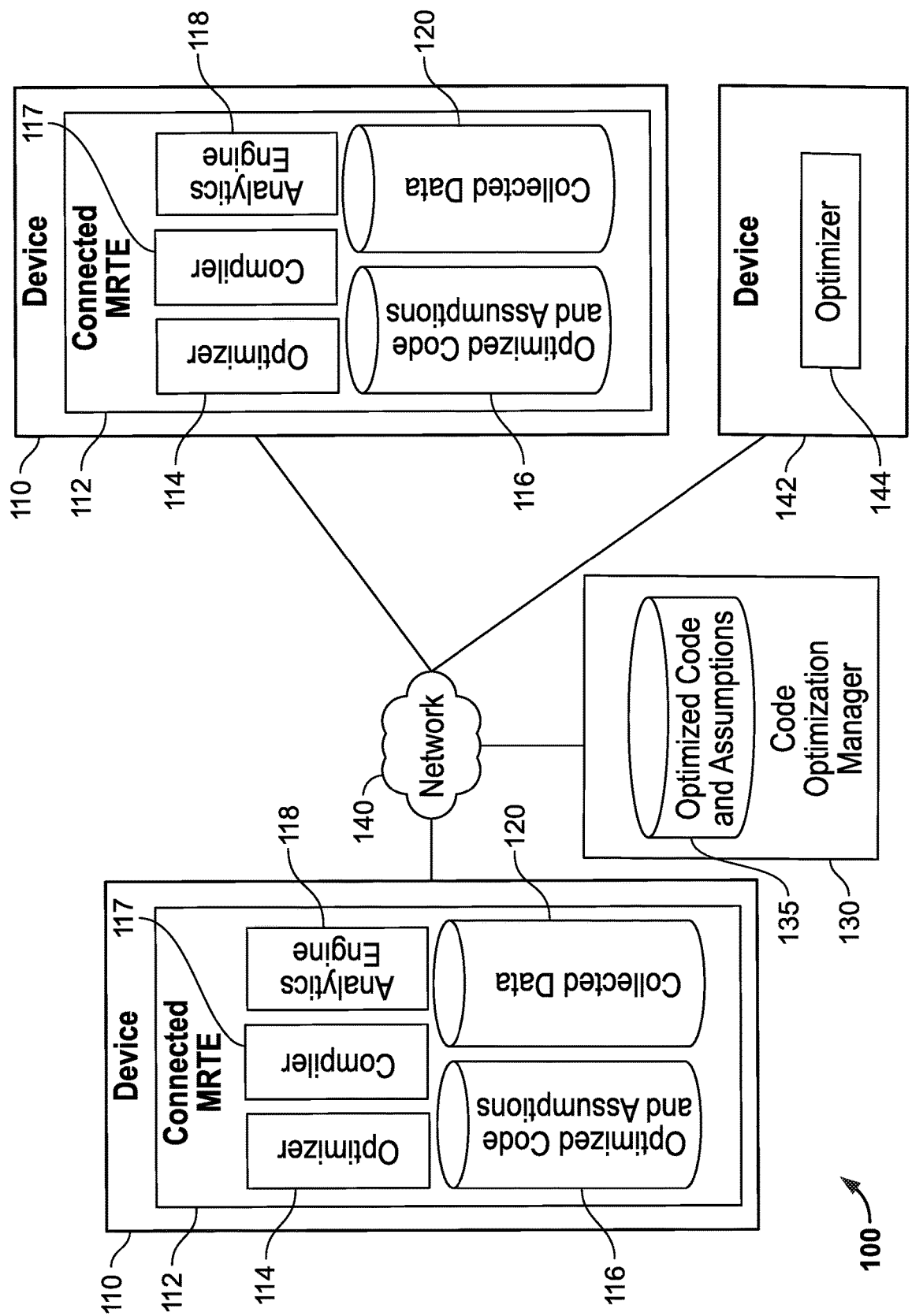
FIG. 1 is a schematic diagram showing an example of a connected managed runtime environment (hereinafter also referred to as a connected MRTE) installed on a device, wherein the connected MRTE is connected to other external entities which provide at least one optimized version of a code unit (e.g., a function or a method) which can be executed in the connected MRTE in accordance with an embodiment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A managed runtime environment (MRTE), also referred to as a dynamic runtime environment, is a virtual execution environment in which code executes. A runtime environment abstracts away the specifics of the operating system and the architecture running beneath it. For example, programs that are written in a high-level programming language are encoded by a source compiler into an architecture-independent format, and the programs can be executed on any platform that has a managed runtime environment installed therein. Examples of high-level programming languages that can be executed on MRTEs include Java, C #, Python, Scala, Go, Ruby, PHP, JavaScript, Objective-C, Swift, Erlan, F #, Clojure, C, C++, and the like. MRTEs provide different management functions, including dynamic compilation of programs to the underlying native machine format, adaptive code optimization, memory management, code management, dynamic type resolution, security, class loading, garbage collection, and the like.

Traditionally, a managed runtime environment is isolated and local to a specific device or platform. An instance of a managed runtime environment on one device does not have the capabilities to communicate or connect to an instance of a managed runtime environment that is situated on another device. In providing the various management functionalities described above, such as adaptive code optimization, a standalone managed runtime environment is self-contained and self-reliant. A standalone managed runtime environment utilizes only resources that are local to the device; for example, a standalone managed runtime environment may only utilize the computational power, data storage, and analytical capabilities that are local to the device. Therefore, the performance or capabilities of the standalone managed runtime environment are limited to what the local resources could handle.

In the present day, the vast majority of application code that is run on a device or platform is also run on hundreds of thousands or even millions of other devices throughout the world. On each of the devices, these application code modules may be executed to repeat the same tasks across multiple runs over a period of time. However, there is often a limited set of common behavior profiles across multiple devices, users, or runs. Therefore, behaviors or patterns that are experienced by and observable by a managed runtime environment on one device may be applicable to other devices as well. But since the managed runtime environment instances typically do not communicate with each other regarding runtime information, the observations or information learned by one managed runtime environment instance cannot be easily shared or re-used by other managed runtime environment instances. Tasks that have already been performed on one device at an earlier time may subsequently be repeatedly performed by other devices, or even the same device, despite the devices sharing a similar or identical set of common behavior profiles. For example, an adaptive code optimizer of a managed runtime environment may be used to optimize a piece of code unit (e.g., a function or a method) such that it runs more efficiently and faster based on the patterns and runtime information that are observable on a particular device, in a particular instance of the managed runtime environment. However, the adaptive code optimizer needs to accumulate enough experience and information over time and employ a significant amount of computing power, data storage, or other resources in order to obtain the optimized piece of code. Furthermore, other adaptive code optimizers of other instances of managed runtime environment have to repeat the same tasks in order to obtain the same piece of optimized code, despite sharing similar or identical characteristics, thus resulting in wasted resources.

In the present application, a connected managed runtime environment (hereinafter also referred to as a connected MRTE) that is connected to other external entities that can provide optimized code to the connected MRTE, or that can perform or provide at least some of the runtime functionalities of the managed runtime environment is disclosed. These entities may include other instances of managed runtime environment that are situated on other devices or platforms. The connected MRTE may be connected to these external entities via one or more networks, such as the Internet. The connected MRTE may be connected to the other external entities by accessing information that was stored in the past in a storage location by an entity that is not currently active. Having connectivity and access to a cloud of external resources or to information stored in the past, the connected MRTE may utilize the benefits of much larger amounts of computational power, data storage, analytical capabilities, and knowledge that are external to its device to provide various management functionalities locally. A connected MRTE can do the same tasks (e.g., execute the same logical code) as an unconnected runtime environment. In other words, a connected MRTE can perform the same logical tasks as an unconnected runtime environment, but in a potentially faster and/or more cost-effective manner. In a connected MRTE, external information may be used to translate a piece of code from one form to another form which has better performance (e.g., replacing an instruction or function with a faster version). A connected MRTE instance uses the collected knowledge of other connected MRTE instances. A connected MRTE may send analytic information (e.g., which code is executed, and how often) to external entities.

As a result, a connected MRTE has many benefits. For example, a connected MRTE provides better performance, in terms of execution speed, efficiency, and cost. A connected MRTE may have improved startup behavior. For example, a connected MRTE instance may have reduced startup and warmup times, because the optimized code for different code units that was previously determined through execution of the same code by other connected MRTE instances may be used immediately by the device at startup. A connected MRTE can reduce CPU costs, startup/teardown cost, power drain, and other resource consumption. In addition, a connected MRTE provides additional features, including anomaly detection, improved security, life cycle and asset management, analytics, and the like.

In the present application, a technique of optimizing a code unit by a managed runtime environment instance on a device is disclosed. An instance of a managed runtime environment is provided. An optimized version of the code unit and a corresponding set of one or more speculative assumptions are received. The validity of each of the set of one or more speculative assumptions may change over time, and may be rendered true or false due to changes to runtime state or conditions within a managed runtime environment instance. The optimized version of the code unit produces the same logical results as the code unit unless at least one of the set of one or more speculative assumptions is not true. The optimized version of the code unit and the corresponding set of one or more speculative assumptions are generated by an entity that is external to the instance of the managed runtime environment. For example, it may be generated by another instance of the managed runtime environment that is different from the instance of the managed runtime environment, or it may be generated by another optimizing entity that is not itself a managed runtime environment, based, at least in part, on speculative assumptions that were at some point observed to be true within another instance of the managed runtime environment that is different from the instance of the managed runtime environment. The optimized version of the code unit in the managed runtime environment is executed on the device. In addition, whether each of the set of one or more speculative assumptions holds true is monitored.

Traditionally, code optimization involves an internal and local conversation between the managed runtime environment and the code optimizer, which together perform as a single process. For example, at startup, the managed runtime environment may run a code unit that has not been optimized. If the code unit is used frequently, the managed runtime environment may request the code optimizer to provide an optimized version of the code unit. The code optimizer then asks the managed runtime environment to provide information regarding runtime conditions or runtime states that are useful for deriving an optimized version of the code. This code optimization conversation includes a series of questions and answers between the managed runtime environment and the code optimizer, which are used by the code optimizer to derive an optimized version of the code unit. The managed runtime environment may then replace the original code with the optimized version and run the optimized version as long as the assumptions of the runtime conditions or states hold true.

However, code optimization that is conducted by a local managed runtime environment and code optimizer is inherently limited. A local device has limited computational power, and applications need to be up and running in a reasonable amount of time. As a result, a local managed runtime environment and code optimizer can afford to optimize only a portion of the code that is being executed on the device.

A connected MRTE is advantageous because a code optimization conversation that was conducted on one connected MRTE at an earlier time may be replayed at another instance of a connected MRTE at a later time. In particular, a code optimization conversation and the resulting versions of optimized code may be recorded or cached in a code optimization query cache and then replayed on another instance of connected MRTE at a later time. Because a connected MRTE may leverage an almost unlimited amount of external resources, many optimizations that would have been unaffordable if performed locally are now attainable.

A method of providing by a code optimization service an optimized version of a code unit to a managed runtime environment on a device is disclosed. Information related to one or more runtime conditions associated with the managed runtime environment that is executing in a different process than that of the code optimization service is obtained, and wherein the one or more runtime conditions are subject to change during the execution of the code unit. The optimized version of the code unit and a corresponding set of one or more speculative assumptions are provided to the managed runtime environment, wherein the optimized version of the code unit produces the same logical results as the code unit unless at least one of the set of one or more speculative assumptions is not true, and wherein the set of one or more speculative assumptions are based on the information related to the one or more runtime conditions.

FIG. 1 is a schematic diagram showing an example of a connected code managing runtime environment (hereinafter also referred to as a connected MRTE) installed on a device, wherein the connected MRTE is connected to other external entities, which provide at least one optimized version of a code unit (e.g., a function or a method) that can be executed in the connected MRTE in accordance with an embodiment. The optimized version of the code unit is an optimized form of the code unit that provides the same logical results as the original code unit given that a set of assumptions is true while the optimized version of the code unit is being executed on the device.

The system 100 comprises a plurality of devices 110 and 142 (FIG. 1 only shows one of each), which are communicatively coupled through a network 140. Each of the devices 110 is configured with a connected MRTE 112 which provides a virtual execution environment in which code executes. Each of the devices 142 is configured with a code optimizer 144. Devices 110 and 142 may comprise a laptop computer, a desktop computer, a tablet computer, a smartphone, or any other device capable of installing and running the connected MRTE 112 or the code optimizer 144. The network 140 may comprise any combination of public or private networks, including intranets, local area networks (LANs), wide area networks (WANs), radio access networks (RANs), Wi-Fi networks and/or the Internet.

A connected MRTE 112 may include all the functionalities of an unconnected MRTE. A connected MRTE 112 can do the same tasks (e.g., execute the same logical code) as an unconnected runtime environment. In other words, a connected MRTE can perform the same logical tasks as an unconnected runtime environment, but with additional enhanced features or enhanced efficiency. A connected MRTE 112 provides different management functions, including dynamic compilation of programs to the underlying native machine format, adaptive code optimization, memory management, code management, dynamic type resolution, security, class loading, garbage collection, and the like. These management functions may be implemented by different modules and components. For example, as shown in FIG. 1, a connected MRTE 112 may include a code compiler 117 configured to compile the bytecode of a method into its native machine code. As shown in FIG. 1, a connected MRTE 112 includes a code optimizer 114 configured to determine the optimized code corresponding to different code units. A connected MRTE 112 also includes an analytic engine 118 configured to determine analytic information based on the data collected by connected MRTE 112 and stored in a storage device 120. One skilled in the art should realize that other modules and components are also present in a connected MRTE 112 but they are not explicitly illustrated in FIG. 1, and that not all modules illustrated in FIG. 1 are a necessary part of a connected MRTE.

A code optimizer 114 in each of the connected MRTEs 112 can generate an optimized version of a code unit (e.g., a function or a method), and the optimized version of the code unit may be shared with other connected MRTEs 112, such that the optimized version of the code unit may be executed by those connected MRTEs 112 on their respective devices. Similarly, a code optimizer 144 can generate an optimized version of a code unit (e.g., a function or a method), and the optimized version of the code unit may be shared with connected MRTEs 112, such that the optimized version of the code unit may be executed by those connected MRTEs 112 on their respective devices. The optimized version of the code unit is an optimized form of the code unit that provides the same logical results as the original code unit given that a set of speculative assumptions is true while the optimized version of the code unit is being executed on the device. The validity of each of the set of speculative assumption may change over time, and may be rendered true or false due to changes to runtime state or conditions within an instance of the MRTE 112. The optimized form of the code unit has better performance (e.g., runs faster and more efficiently) but has the same program logic and can achieve the same results as the original un-optimized/pre-optimized code unit, as long as the associated set of speculative assumptions holds true.

In some embodiments, the optimized version of a code unit generated by a connected MRTE 112 and the corresponding set of assumptions may be sent directly to another connected MRTE 112 via network 140, upon a request being received by the connected MRTE 112.

In some embodiments, the generation of the optimized code for a plurality of code units is managed by a code optimization manager 130. In some embodiments, a plurality of code optimization managers 130 may be deployed at different locations, e.g., in data centers or in the cloud. For example, the code optimization manager 130 may determine which MRTE 112 or code optimizer 144 is responsible for generating the optimized code for which code unit based on resource availability, load balancing, network traffic, and/or other factors. In some embodiments, the responsible MRTEs 112 or code optimizer 144 may be limited to those that are installed on the subset of devices 110 and 142 that are trusted by code optimization manager 130. For example, the responsible MRTEs 112/code optimizer 144 and code optimization manager 130 may belong to the same entity or may be under the control of the same administrator. The code optimization manager 130 may determine which code units should be optimized by one of the MRTEs 112 based on how frequently the code units are being executed, resource availability, load balancing, network traffic, and/or other factors. In some embodiments, the code optimization manager 130 may process the request for the optimized code of a particular code unit from a connected MRTE 112 and direct the connected MRTE 112 to obtain the optimized code from one of the other connected MRTEs 112, or from one of the code optimizers 144. In some embodiments, the code optimization manager 130 may receive the optimized code for all the code units generated by all of the connected MRTEs 112. The received optimized code for the plurality of code units and their corresponding sets of assumptions may be maintained in an optimized code library 135, such that each connected MRTE 112 may obtain any optimized code from a centralized location instead of fetching the optimized code from different MRTEs 112 or code optimizers 144 directly. In some examples, the code optimization manager 130 may comprise a server and/or any other apparatus suitable for collecting optimized code for a plurality of code units from the various connected MRTEs 112 and serving the optimized code for the plurality of code units to other connected MRTEs 112. The code optimization manager 130 may further comprise a storage device, a database, and/or any other apparatus suitable for storing the optimized code for the plurality of code units and their corresponding sets of assumptions.

Figure 2:
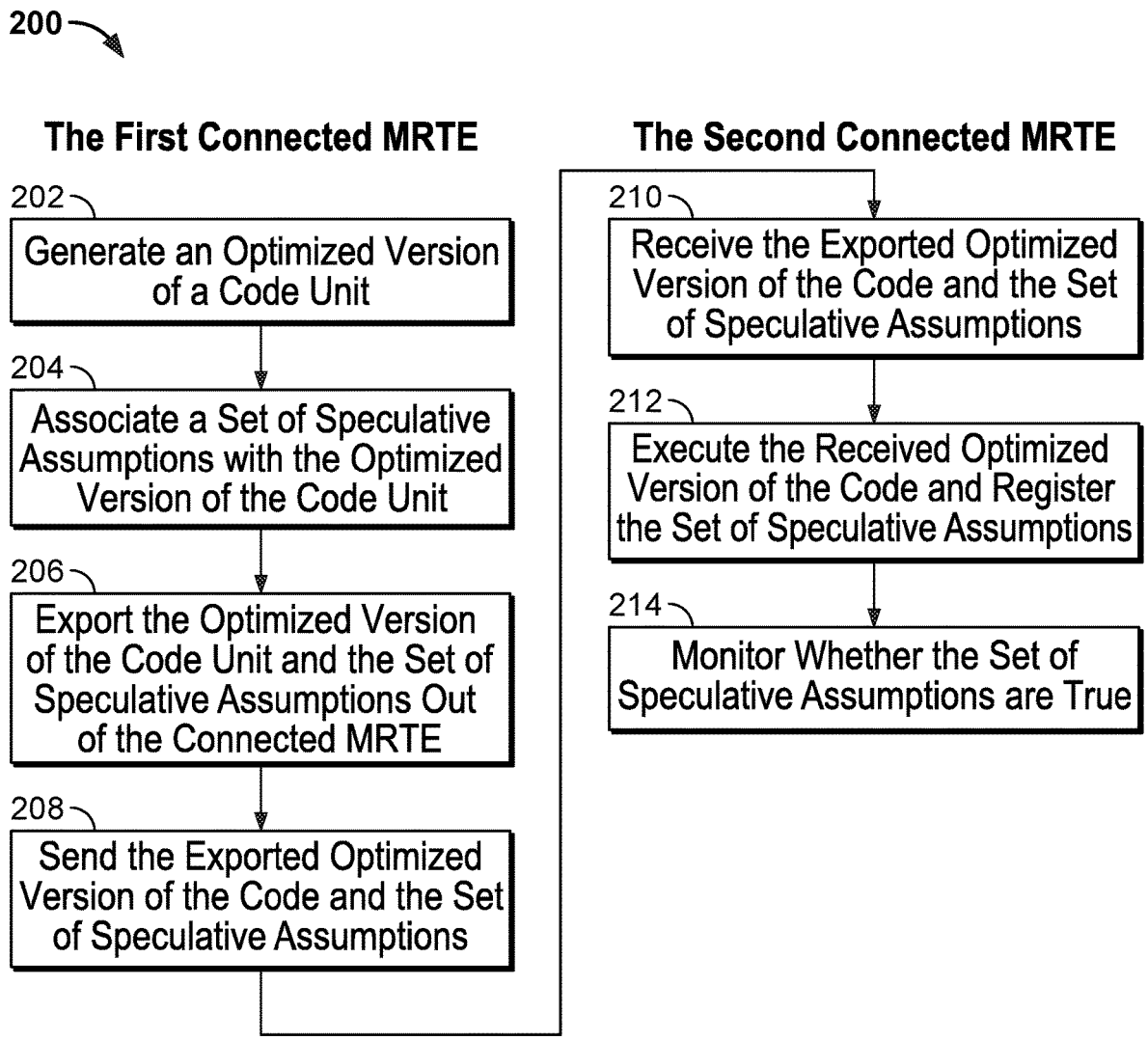
FIG. 2 illustrates an example of a process 200 for receiving an optimized version of a code unit by a connected MRTE 112 on one device from another instance of connected MRTE 112 on another device and executing the optimized version of the code unit on the device until at least one speculative assumption associated with the optimized version is no longer true.

FIG. 2 illustrates an example of a process 200 for receiving an optimized version of a code unit by a connected MRTE 112 on a first device from another instance of connected MRTE 112 on a second device and executing the optimized version the code unit on the first device until at least one speculative assumption associated with the optimized version is no longer true. In some embodiments, process 200 is performed by system 100 as shown in FIG. 1.

At step 202, an optimized version of a code unit is generated. For example, step 202 is performed by one of the connected MRTEs 112 (hereinafter referred to as the first connected MRTE) installed in one of the devices 110 (hereinafter referred to as the first device) in FIG. 1. At step 204, a set of speculative assumptions is associated with the optimized version of the code unit. Step 202 and step 204 of process 200 are described in greater detail below.

In some embodiments, code optimizer 114 of the first connected MRTE 112 performs just-in-time (JIT) optimization and speculative optimization. Code optimizer 114 may speculatively optimize a code unit by making a set of speculative assumptions on the runtime state of the code. The generated speculatively optimized code can be de-optimized if any of the set of speculative assumptions no longer holds. The connected MRTE 112 has asynchronous code generation and replacement capabilities. For example, a connected MRTE 112 may replace the optimized code with another piece of code (e.g., the un-optimized/pre-optimized original code unit or a new piece of optimized code) while the code is running at real time, without restarting the program again. The switching of the code may be performed on the fly and just prior to any of the set of speculative assumptions becoming invalid.

FIG. 3 illustrates one example of speculative optimization of a code unit that may be performed by the code optimizer 114 of the first connected MRTE 112. On the left side of FIG. 3 is an original un-optimized/pre-optimized code unit 310 of a function foo( ). On the right side of FIG. 3 is the corresponding optimized code unit 320 of the function foo( ) after speculative optimization is performed. The example in FIG. 3 will be used to illustrate the steps 202 and 204 of process 200 as shown below.

In the original function foo( ) 310, the value of the global variable var1 is checked in an if-else statement. In particular, if the global variable var1 has a value that is less than five, then only one statement is executed, and if the global variable var1 has a value that is greater than or equal to five, then a total of three statements (i.e., statements 2, 3, and 4) are executed. Suppose that the first connected MRTE 12 observes that the global variable var1 has stayed at a value that is less than five for more than a predetermined number of runs/occurrences or for longer than a predetermined period of time; then, the first connected MRTE 12 may predict that the global variable var1 will have a value of less than five indefinitely. Accordingly, code optimizer 114 may modify the original function foo( ) 310 to a simplified and faster version as shown in the optimized code unit 320. In particular, the checking of the value of the global variable var1 using the if-else statement is removed, because the associated speculative assumption on the runtime state of the code is that var1 is always less than five. In addition, the three statements (i.e., statements 2, 3, and 4) are removed from the function foo( ), as it is assumed that the branch of the else statement will never be taken. As a result, the modified function foo( ) 320 runs faster with fewer checking steps, and the length of the code unit is also reduced. The assumption here that the global variable var1 is less than five is speculative because code optimizer 114 can only predict that the variable var1 is less than five with a high probability. However, code optimizer 114 cannot prove that var1 is always less than five and therefore there exists a slight possibility that the value of var1 may change at a future time.

FIGS. 4-6 illustrate another example of speculative optimization of a code unit that may be performed by the code optimizer 114 of the first connected MRTE 112. The example in FIGS. 4-6 will be used to illustrate the steps 202 and 204 of process 200 as shown below.

FIG. 4 illustrates the declaration of animal and the declarations of the subclasses of the class animal. On the left side of FIG. 4 is a class declaration of animal 410. On the top right side of FIG. 4 is a class declaration for a rhino class 420 that is a subclass of the class animal 410. On the bottom right side of FIG. 4 is a class declaration for an elephant class 430 that is a subclass of the class animal 410.

As shown in FIG. 4, the rhino class 420 inherits all the fields (e.g., color) and methods of the class animal 410 and adds the field numHorns and a method to set the field. The elephant class 430 inherits all the fields (e.g., color) and methods of the class animal 410 and adds the field numTusks and a method to set the field. Since neither the rhino class 420 nor the elephant class 430 has its own method to set its color, both the rhino class 420 and the elephant class 430 inherits the animal class's method of getColor( ).

FIG. 5 illustrates the code unit foo( ) before and after optimization is performed by the code optimizer 114. On the left side of FIG. 5 is an original un-optimized/pre-optimized code unit 510 of a function foo( ). On the right side of FIG. 5 is the corresponding optimized code unit 520 of the function foo( ) after speculative optimization is performed.

In the original function foo( ) 510, the value of the variable C is assigned a value by calling the method animal.getColor( ). Suppose that code optimizer 114 observes over a period of time that the only subclasses of animal are rhino and elephant and that both of the subclasses inherit the animal class's method of getColor( ). Code optimizer 114 may modify the original function foo( ) 510 to a simplified and faster version as shown in the optimized code unit 520. In particular, the calling of the method animal.getColor( ) is removed by inlining, such that the function call is replaced by the body of the method animal.getColor( ). The associated speculative assumption in the runtime state of the code is that all animals share the same implementation of getColor( ), which is always implemented the same way by returning the value animal.color. By accessing animal.color directly instead of through a method call, the execution time of the modified function foo( ) 520 is reduced. The assumption here that there is only one implementation of getColor( ) for all subclasses of animal is speculative because code optimizer 114 can only predict that this is true with a high probability. However, code optimizer 114 cannot prove that all subclasses of animal inherit the animal class's method getColor( ), and therefore there is a slight possibility that the assumption may fail at a future time.

FIG. 6 illustrates one example of when the speculative assumption associated with the modified function foo( ) 520 is violated. FIG. 6 illustrates the declaration of a chameleon class, which is a subclass of the class animal. As shown in FIG. 6, the chameleon class 610 inherits all the fields (e.g., color) and methods of the class animal 410 and adds the field surroundingColor. Unlike the subclass rhino 420 and subclass elephant 430, the chameleon class 610 has a unique implementation of getColor( ) that is different from the animal class's method getColor( ). When the subclass chameleon 610 is loaded, the assumption that there is only one implementation of getColor( ) for all subclasses of animal is no longer valid, and as a result, the optimized code unit 520 of the function foo( ) can no longer provide the same logical results as the original code unit 510 of function foo( ).

Referring back to FIG. 2, at step 206, the optimized version of the code unit and the set of speculative assumptions associated with the optimized version of the code unit are exported from the first connected MRTE 112, such that they may be consumed by an entity external to the first connected MRTE 112. In some embodiments, the optimized version of the code unit and the set of speculative assumptions associated with the optimized version of the code unit may also be optionally stored in a code library/cache 116 within the first connected MRTE 112.

As described earlier, traditionally a standalone MRTE does not have the capabilities to communicate or connect to another instance of managed runtime environment that is situated on another device. In providing the various management functionalities, a standalone MRTE is self-contained and self-reliant. In addition, all of the information and processing of the standalone MRTE is kept internally. Therefore, a standalone MRTE does not capture or record the set of speculative assumptions that are used to derive the optimized version of a code unit in such a way that the set of assumptions is consumable by an external instance of MRTE. As a result, there is no information available to another instance of MRTE that would allow the detection of wrong assumptions and the reversion or removal of the optimized code that rely on the wrong assumptions. Without exporting the set of speculative assumptions, code optimization will be limited to the type of optimization that is based on information that is known to remain true. In other words, speculative optimization that is highly valuable cannot be supported. Therefore, in order to support the use of object and executable code that may include speculative optimizations, information about the speculative assumptions made in creating the optimized code is registered with the optimized code, and then the information plus the code are exported from the first connected MRTE 112, such that the entire package may be shared with other connected MRTEs.

Figure 7:
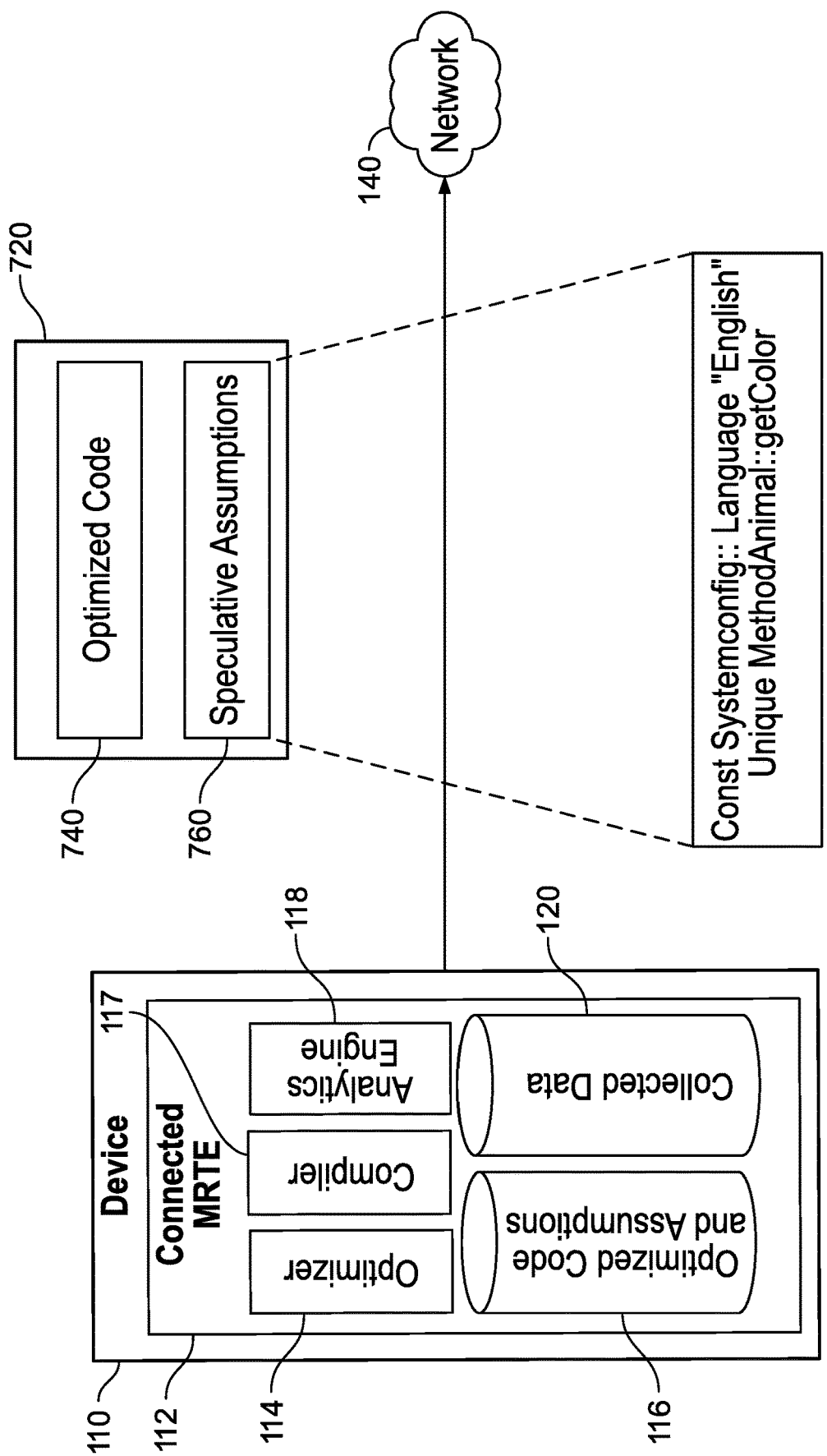
FIG. 7 illustrates that a package of information, including the optimized version of a code unit and the set of speculative assumptions associated with the optimized version of the code unit, is exported from the first connected MRTE.

FIG. 7 illustrates that a package of information 720, including the optimized version of a code unit 740 and the set of speculative assumptions 760 associated with the optimized version of the code unit, is exported from the first connected MRTE 112. As shown in FIG. 7, the speculative assumptions 760 may be sent as metadata along with the optimized code 740. In some embodiments, the speculative assumptions 760 may be encoded using tags. A tag is a keyword or term assigned to a piece of information. It is a type of metadata that helps to describe an item and allows it to be found again by browsing or searching. A tag for a speculative assumption may encode the information that a connected MRTE needs in order enforce the speculative assumption. For example, the tag 'const systemconfig:: language "English"' may be used to encode the information that the configured language on the system is assumed to be English. In this example, the portions of the original code unit that are used to check the type of language used and that are used to handle all the processing for any languages other than English may be removed, thereby simplifying the code and making the code more efficient. The tag 'unique method animal::getColor' may be used to encode the information that the method animal.getColor( ) is the only implementation of getColor( ) for all subclasses of animal. The tag for a speculative assumption may specify a runtime state or condition, such as the field or method of an object or a class, along with the requirement or constraint of the runtime state or condition. One skilled in the art should realize that there are many ways to encode the information corresponding to a speculative assumption and also many ways to integrate the encoded information with the optimized code together as a package. The above examples are merely provided for illustrative purposes and therefore are not exhaustive.

Referring back to FIG. 2, at step 208, the optimized version of the code unit and the set of speculative assumptions associated with the optimized version of the code unit are sent through network 140. In some embodiments, the optimized version of a code unit generated by the first connected MRTE 112 and the corresponding set of assumptions may be sent directly to another connected MRTE (hereinafter referred to as a second connected MRTE 112) installed in another device 110 (hereinafter referred to as a second device) via network 140, as described earlier. In some embodiments, the optimized version of a code unit generated by the first connected MRTE 112 and the corresponding set of assumptions may be sent to code optimization manager 130 via network 140 first, and then subsequently sent to the second connected MRTE 112, as described earlier. In some embodiments, the optimized version of a code unit generated by the first connected MRTE 112 and the corresponding set of assumptions may be stored in a storage location that is later accessed by the second connected MRTE 112.

At step 210, the optimized version of the code unit and the set of speculative assumptions associated with the optimized version of the code unit are received by the second connected MRTE 112 via network 140. In some embodiments, the optimized version of the code unit and the corresponding set of assumptions may be received directly from the first connected MRTE 112. In some embodiments, the optimized version of the code unit and the corresponding set of assumptions may be received from code optimization manager 130. In some embodiments, the optimized version of the code unit is only received by the second connected MRTE 112 after it has been verified that the first connected MRTE 112 and the second connected MRTE 112 (or their respective devices) share a similar or identical set of common behavior profiles and therefore that the set of speculative assumptions is highly probable to hold true when the optimized version of the code is executed on the second device 110. The similar or identical set of behavior profiles may include a plurality of runtime conditions or runtime states. A runtime condition may include (but is not limited to) the state of a field of an object or a class, the state of a method of a class, the state of a class, the state of an object, the code for a code unit in a method of a class, the current validity of a speculative assumption, a count of the number of executions of a code path seen, a set of one or more ratios between the number of executions of different code paths, a set of types observed in a variable or field, as well as the state of other runtime information that may be useful for optimizing the code of a code unit. In some embodiments, the optimized version of the code unit is only received by the second connected MRTE 112 after it has been verified that the set of speculative assumptions currently holds true. In some embodiments, the optimized version of the code unit is selected from a plurality of possible optimized versions of the code unit based, at least in part, on a set of one or more runtime conditions or runtime states observed or provided by the second MRTE 112 which are used to determine which optimized versions of the code unit have a corresponding set of assumptions that currently hold true.

At step 212, the optimized version of the code unit that is generated by the first connected MRTE 112 on the first device 110 is being executed by the second connected MRTE 112 installed on the second device 110. In addition, the set of speculative assumptions associated with the optimized version of the code unit is registered and recorded by the second connected MRTE 112.

For example, the optimized version of the code unit is received by the second connected MRTE 112 at the time of startup, and the optimized version of the code unit may be executed instead of the original code unit at any time. In another example, the optimized version of the code unit is received by the second connected MRTE 112 after the original code unit has already been executing in the second connected MRTE 112 for a period of time. In this case, the second connected MRTE 112 may use its code replacement capabilities to replace the original code unit with the received optimized version of the code unit without restarting.

The set of speculative assumptions associated with the optimized version of the code unit is registered in the second connected MRTE 112, such that the set of speculative assumptions may be enforced by the second connected MRTE 112. In some embodiments, the speculative assumptions may be stored as metadata along with the optimized code, which can be stored in a cache or a file. In some embodiments, the speculative assumptions may be encoded using tags. A tag is a keyword or term assigned to a piece of information. A tag for a speculative assumption may encode the information that the second connected MRTE 112 needs in order to enforce the speculative assumption. For example, the tag 'const systemconfig::language "English"' may be used to encode the information that the configured language on the system is assumed to be English. The tag 'unique method animal::getColor' may be used to encode the information that the method animal.getColor( ) is the only implementation of getColor( ) for all subclasses of animal. The tag for a speculative assumption may specify the field or method of an object or a class, along with the requirement or constraint of the field or method. The tag may be specified by the optimizer that generates the code to record an assumption that the optimizer relies on in generating the code. A tag is part of the encoding of an assumption, and assumptions may be stored as metadata along with the optimized code, e.g., in a cache or a file.

At step 214, whether each of the set of speculative assumptions remains true is being monitored by the second connected MRTE 112. For example, the occurrence of any violation of the set of speculative assumptions may be monitored by the second connected MRTE 112. The optimized version of the code unit can no longer provide the same logical results as the original code unit if any of the set of speculative assumptions is no longer true. Continuing with the example as shown in FIG. 3, if the global variable var1 is assigned a new value that is greater than or equal to five, then the method foo( ) should execute a total of three statements (i.e., statements 2, 3, and 4) prior to the execution of statement 5, rather than statement 1 alone. Accordingly, the occurrence of the global variable var1 being assigned a value that is greater than or equal to five is monitored by the second connected MRTE 112. Alternatively, the occurrence of one or more events that will lead to the global variable var1 being assigned to a value that is greater than or equal to five may be monitored by the second connected MRTE 112. For example, suppose that the value of the global variable var1 is only changed by one or more functions. Then the calling or the execution of those functions may be monitored by the second connected MRTE 112 instead.

Continuing with the example as shown in FIGS. 4-6, if the subclass chameleon 610 is loaded, the assumption that there is only one implementation of getColor( ) for all subclasses of animal is no longer valid and, as a result, the optimized code unit 520 of the function foo( ) can no longer provide the same logical results as the original code unit 510 of function foo( ). Accordingly, the occurrence of the loading of the subclass chameleon 610 is monitored by the second connected MRTE 112. Alternatively, the occurrence of one or more events that will lead to the loading of the subclass chameleon may be monitored by the second connected MRTE 112. For example, suppose that the instantiation of the subclass chameleon 610 is only done by one or more functions. Then the calling or the execution of those functions may be monitored by the second connected MRTE 112 instead.

In some embodiments, the occurrence of the violation of the assumption or the occurrence of an event that will lead to the violation of the assumption is intercepted just before the actual occurrence. The second connected MRTE 112 may then prevent any further execution of the optimized version of the code unit. For example, the second connected MRTE 112 may de-optimize the code unit by using its code replacement capabilities to replace the optimized version of the code unit with the original code, without restarting. In addition, the set of speculative assumptions may be de-registered from the second connected MRTE 112, such that the set of speculative assumptions is no longer being monitored by the second connected MRTE 112. In some embodiments, the second connected MRTE 112 may trigger code optimizer 114 to optimize the code unit again in order to generate a new optimized version of the code unit based on the latest state or settings on the second device 110. In some embodiments, the second connected MRTE 112 may send a request to code optimization manager 130 to obtain another version of the optimized code that is matching the current state or settings on the second device 110.

In some embodiments, the occurrence of the violation of the assumption is detected after the actual occurrence. In addition to the de-optimization and de-registration described above, the second connected MRTE 112 may need to perform additional corrective actions. For example, the second connected MRTE 112 may determine whether the optimized version of the code unit has been called after the violation of the assumption has occurred. Continuing with the example in FIGS. 4-6, the second connected MRTE 112 may determine whether the optimized code unit 520 has been executed after the subclass chameleon is loaded. If the optimized version of the code unit 520 has been called, then the second connected MRTE 112 may perform corrective actions to reverse any logically incorrect state or behavior caused by the optimized version of the code unit 520.

In some embodiments, a connected MRTE 112 on a device derives an optimized version of a code unit by conducting a code optimization conversation with an external entity, i.e., an entity that is external to the connected MRTE 112. For example, code optimization manager 130 or a code optimizer that is under the control of code optimization manger 130 may provide a code optimization service to the connected MRTE 112, wherein the code optimizer is running on a device that is different from the connected MRTE's device, and wherein the code optimizer is running in a process that is different from that of the connected MRTE. In providing the code optimization service, code optimization manager 130 or the code optimizer asks the connected MRTE 112 to provide information regarding its runtime conditions or runtime states that are useful for deriving an optimized version of the code and its corresponding set of speculative assumptions. This code optimization conversation includes a series of questions and answers related to the runtime conditions or runtime states between the code optimization service and the connected MRTE 112.

Figure 8:
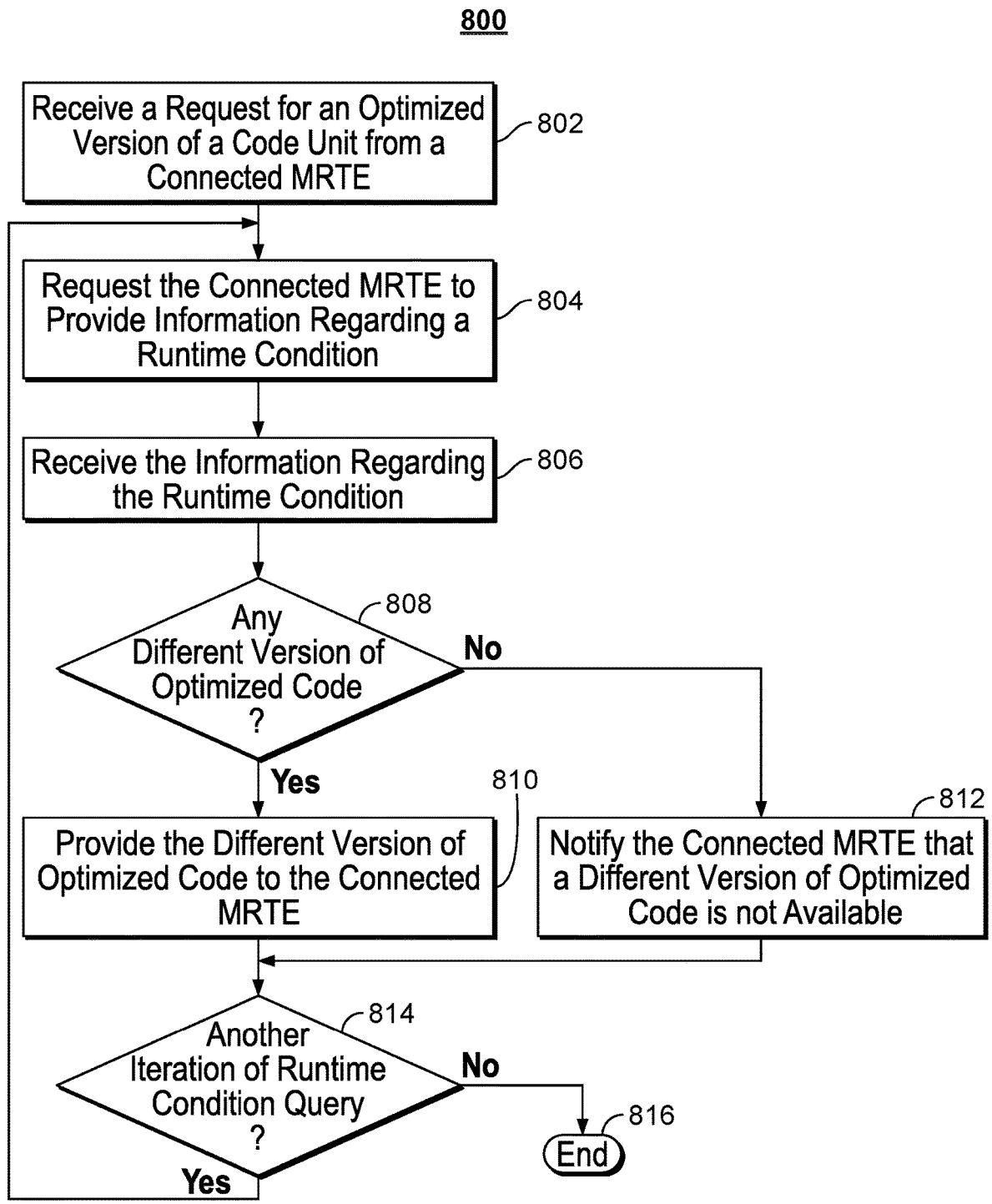
FIG. 8 illustrates an example of a process 800 for a code optimization service to provide an optimized version of a code unit to a connected MRTE through a code optimization conversation between the code optimization service and the connected MRTE.

FIG. 8 illustrates an example of a process 800 for a code optimization service to provide one or more optimized versions of a code unit to a connected MRTE through a code optimization conversation between the code optimization service and the connected MRTE. The example in FIG. 9 and FIG. 10 will be used to illustrate the steps of process 800 as shown below.

Figure 9:
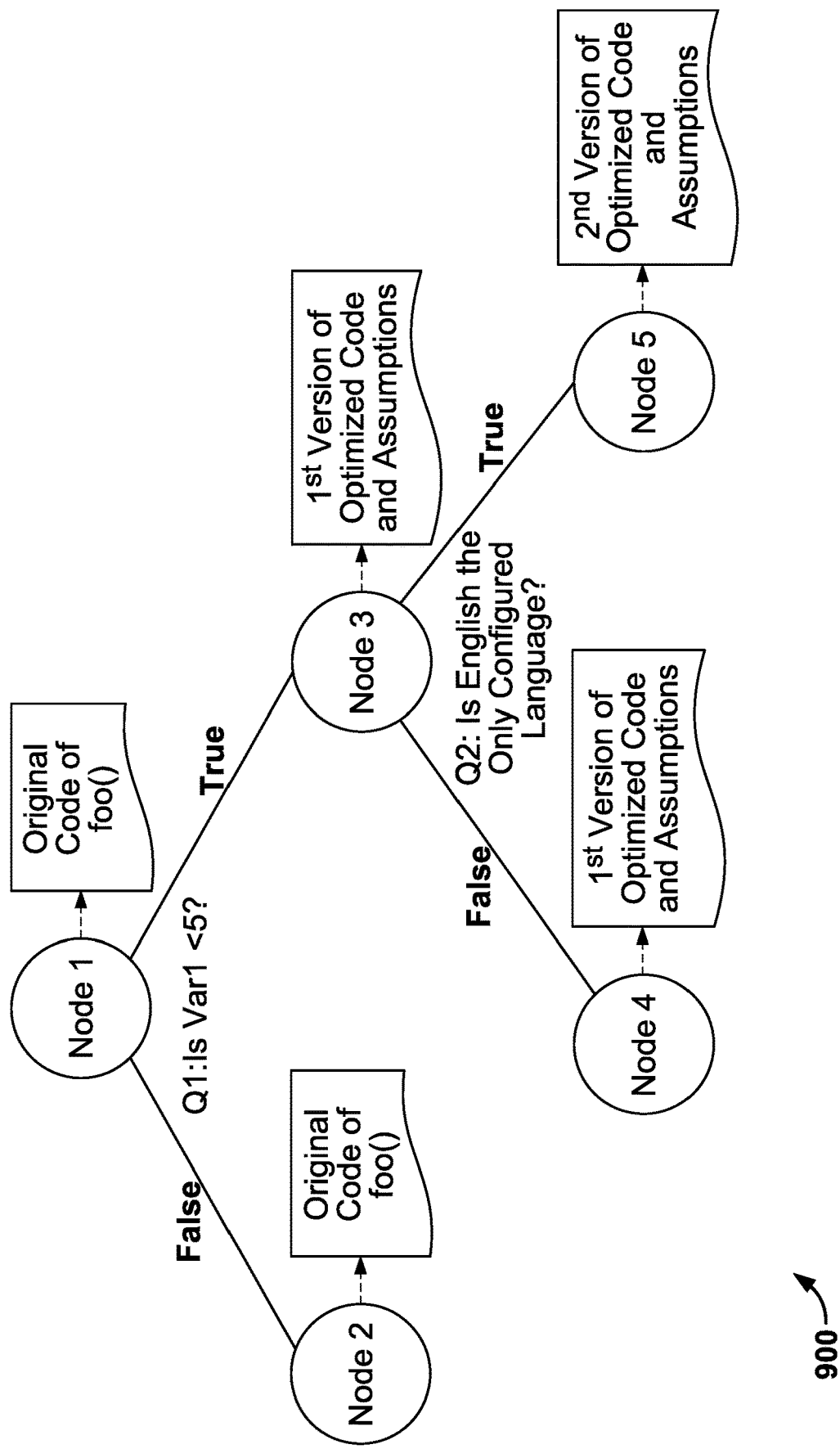
FIG. 9 illustrates one example of a code optimization conversation 900 that may be conducted between the code optimization manger 130 and the connected MRTE 112.

FIG. 9 illustrates one example of a code optimization conversation 900 that may be conducted between the code optimization service and the connected MRTE 112. In this example, code optimization conversation 900 is shown as a decision tree, in which each internal node represents a question regarding a runtime condition, and each branch represents an answer corresponding to the question. One of ordinary skill in the art should realize that the types of runtime conditions and runtime states that are being queried during a code optimization conversation may be dependent on the piece of code that is being optimized. One of ordinary skill in the art should also realize that the runtime conditions and runtime states may be queried in any given order, which may be dependent on the type of device, user, settings, and the like. Some of the runtime conditions and runtime states may not be queried by the code optimization service because of the type of device, user, settings, and other factors. Therefore, a particular code unit may have one or more code optimization conversations recorded in an optimization query cache, wherein each code optimization conversation has its own set of questions and answers, along with the optimized code and speculative assumptions that are derived at different stages of the code optimization conversation. The example in FIG. 9 is merely provided for illustrative purposes and therefore should not be viewed as limiting.

FIG. 10 illustrates one example of a code unit and different versions of optimized code that are derived respectively at the different stages of the code optimization conversation 900 as shown in FIG. 9. For example, the different versions of optimized code shown in FIG. 10 are associated with the different nodes of the code optimization conversation 900.

Returning to FIG. 8, at 802, a request for an optimized version of a code unit is received. For example, one of the connected MRTEs 112 installed in one of the devices 110 has observed that the code unit foo( ) has been executed on the device for a number of times and that the number of times is above a predetermined threshold, which triggers the connected MRTE 112 to send a request to the code optimization service, requesting the code optimization service to provide one or more optimized versions of the code unit foo( ) to the connected MRTE 112. With reference to FIG. 10, an original un-optimized/pre-optimized code unit 1010 of the function foo( ) is shown on the left. In some embodiments, in addition to the request, the code unit foo( ) may be sent to the code optimization service.

At step 804, a request for information related to a runtime condition or runtime state associated with the connected MRTE 112 is sent to the connected MRTE 112. Referring to the code optimization conversation 900 in FIG. 9 as an example, the code optimization service may ask the connected MRTE 112 to provide information regarding the value of the global variable var1, because the function foo( ) may be simplified if the global variable var1 has certain values. As shown in FIG. 10, in the original function foo( ) 1010, the value of the global variable var1 is checked in an if-else statement. In particular, if the global variable var1 has a value that is less than five, then only one statement (i.e., statement 1) is executed, and if the global variable var1 has a value that is greater than or equal to five, then a total of three statements (i.e., statements 2, 3, and 4) are executed. Accordingly, the first question (Q1) posed to the connected MRTE 112 by the code optimization service is whether the global variable var1 has been observed by the connected MRTE 112 as having values that are less than five.

At step 806, the requested information related to the runtime condition or runtime state is received by the code optimization service from the connected MRTE 112. Suppose that the connected MRTE 12 observes that the global variable var1 has stayed at a value less than five for more than a predetermined number of runs/occurrences or for longer than a predetermined period of time; then, the connected MRTE 12 may predict that the global variable var1 will have a value of less than five indefinitely and, accordingly, the connected MRTE 112 may notify the code optimization service that the answer to Q1 is true (i.e., the global variable var1 is less than five). The code optimization conversation 900 thus transits from node 1 to node 3. Conversely, suppose that the connected MRTE 112 observes that the global variable var1 has stayed at a value that is greater than or equal to five for more than a predetermined number of runs/occurrences or for longer than a predetermined period of time; then, the connected MRTE 112 may notify the code optimization service that the answer to Q1 is false (i.e., the global variable var1 is greater than or equal to five). The code optimization conversation 900 thus transits from node 1 to node 2.

At step 808, it is determined whether a new optimized version of the code unit is available. Continuing with the scenario that the answer to Q1 is true and that the state of the code optimization conversation 900 is node 3, a new optimized version of the code unit (first version of optimized code 1020 of foo( ) as shown in FIG. 10) is available, and process 800 proceeds to step 810 next. In the first version of optimized code 1020, the checking of the value of the global variable var1 using the if-else statement is removed, because the associated speculative assumption on the runtime state of the code is that var1 is always less than five. In addition, the three statements (i.e., statements 2, 3, and 4) are removed from the function foo( ), as it is assumed that the branch of the else statement will never be taken. As a result, the modified function foo( ) 1020 runs faster with fewer checking steps, and the length of the code unit is also reduced. The assumption here that the global variable var1 is less than five is speculative because there exists a slight possibility that the value of var1 may change at a future time.

Conversely, continuing with the scenario that the answer to Q1 is false and that the state of the code optimization conversation 900 is node 2, a new optimized version of the code unit is not available, and process 800 next proceeds to step 812.

At step 810, the new and different optimized version of the code unit is provided to the connected MRTE 112. The connected MRTE 112 may use its code replacement capabilities to replace the original function foo( ) 1010 with the first optimized version of the code unit 1020 without restarting. In addition, the set of speculative assumptions associated with the first version of optimized code (i.e., var1<5) is registered and recorded by the connected MRTE 112.

At step 812, the connected MRTE 112 is notified that a different version of optimized code is not available. Therefore, the connected MRTE 112 continues to run the original function foo( ) 1010 on the device 110.

After step 810 or step 812 is performed, process 800 proceeds to step 814. At step 814, it is determined whether there is another iteration in which another runtime condition is being queried. If there is another iteration in which another runtime condition is being queried, then process 800 proceeds back to step 804; otherwise, process 800 is done at step 816.

If process 800 proceeds back to step 804, then another request for information related to a runtime condition or runtime state is sent to the connected MRTE 112. Referring to the code optimization conversation 900 in FIG. 9, the code optimization service may ask the connected MRTE 112 to provide information regarding the language setting, because according to FIG. 10, the function foo( ) may be simplified if the language setting is always English. In the original function foo( ) 1010, the configured language setting is checked in an if-else statement. In particular, if the configured language setting is English, then only one statement is executed, and if the configured language setting is not English, then a total of two statements (i.e., statements 7 and 8) are executed. Accordingly, the second question (Q2) posed to the connected MRTE 112 by the code optimization service is whether the language setting has been observed by the connected MRTE 112 as being configured to English.

At step 806, the requested information related to the runtime condition or runtime state is received by the code optimization service from the connected MRTE 112. Suppose that the connected MRTE 12 observes that the language setting is always English over a predetermined number of runs/occurrences or over a predetermined period of time; then, the connected MRTE 12 may predict that the language setting is English indefinitely and accordingly, the connected MRTE 112 may notify the code optimization service that the answer to Q2 is true (i.e., English is the only configured language). The code optimization conversation 900 thus transits from node 3 to node 5. Conversely, suppose that the connected MRTE 12 observes that the configured is either English or Spanish over a predetermined number of runs/occurrences or over a predetermined period of time; then, the connected MRTE 112 may notify the code optimization service that the answer to Q2 is false (i.e., English is not the only configured language). The code optimization conversation 900 thus transits from node 3 to node 4.

At step 808, it is determined whether a new optimized version of the code unit is available. Continuing with the scenario that the answer to Q2 is true and that the state of the code optimization conversation 900 is node 5, a different optimized version of the code unit (second version of optimized code 1030 of foo( ) as shown in FIG. 10) is available, and process 800 proceeds to step 810 next. The different optimized version of the code unit is derived from the information obtained from the answer to Q2. In the second version of optimized code 1030, the checking of the language setting using the if-else statement is removed, because the associated speculative assumption on the runtime state of the code is that the language setting is always English. In addition, the two statements (i.e., statements 7 and 8) are removed from the function foo( ), as it is assumed that the branch of the else statement will never be taken. As a result, the modified function foo( ) 1030 runs faster with fewer checking steps, and the length of the code unit is also reduced. The assumption here that the language setting is English is speculative because there exists a slight possibility that the configured language may change at a future time.

Conversely, continuing with the scenario that the answer to Q2 is false and that the state of the code optimization conversation 900 is node 4, a new optimized version of the code unit is not available, and process 800 proceeds to step 812 next.

At step 810, the new optimized version of the code unit is provided to the connected MRTE 112. The connected MRTE 112 may use its code replacement capabilities to replace the first version of optimized code 1020 with the second version of optimized code 1030 without restarting. In addition, the set of speculative assumptions associated with the second version of optimized code (i.e., var1<5 and English is the only configured language) is registered and recorded by the connected MRTE 112.

At step 812, the connected MRTE 112 is notified that a new version of optimized code is not available. Therefore, the connected MRTE 112 continues to run the first version of optimized code 1020 on the device 110.

After step 810 or step 812 is performed, process 800 proceeds to step 814. At step 814, it is determined whether there is another iteration in which another runtime condition is being queried. If there is another iteration, then process 800 proceeds back to step 804; otherwise, process 800 is done at step 816. Referring to the code optimization conversation 900 in FIG. 9, no additional runtime condition needs to be queried, and as a result the process 800 is completed at step 816.

A code optimization conversation has one or more iterations. In each of the iterations, a new question regarding a runtime condition is posed to the connected MRTE 112. The iterations of a code optimization conversation may be asynchronous. In particular, after n number of iterations of questions and answers, the code optimization service may pause the code optimization conversation for a period of time, and then resume the code optimization conversation with additional iterations of questioning and answering again at a later time. In this way, the connected MRTE 112 is able to run a version of optimized code on its device while waiting for another improved version at a later time. The advantage is that it can reduce the startup time of the connected MRTE 112 while it is waiting for an optimized version that may require a significant amount of computation and resources to obtain. Having an evolving code optimization conversation over time also has the advantage that external entities and servers outside of a runtime's local device can work to refine, improve, or otherwise vary the optimizations for a conversation that has happened in the past, arriving at alternative and potentially better code; for example, heavier optimization computation or a wider scope of analysis may be used. Optimized code may be produced for target architectures (e.g., other CPU types and models, device types, operating systems, libraries, and environments) other than the one initially requested.

A code optimization conversation may be stored in a code optimization query cache for future runs. In some embodiments, the code optimization conversation is stored in a tree data structure. However, other data structures may be used as well. The data structure may include information that allows the code optimization conversation to be repeated at a later time. For example, the data structure may include node or state transition information, the questions posed to a connected MRTE, the code (e.g., the original code or the optimized code versions) that is associated with each of the nodes and the code's associated set of assumptions.

The advantage of storing or caching the code optimization conversation is that a previously generated code optimization conversation is replayable at a later time. The previously generated code optimization conversation may be repeated and replayed back to the same connected MRTE 112 or a different connected MRTE 112. Instead of conducting a conversation with an external code optimizer, as described earlier, the connected MRTE 112 may conduct a conversation using process 800 with an external entity, such as a storage device or cache storing the previously generated code optimization conversation.

A code optimization conversation may be saved or cached in a code optimization query cache at multiple levels and tiers, e.g., locally on a device or in the cloud. For example, the code optimization conversation caching may be done in hierarchies, such as on the device, in a nearby datacenter, or in the cloud.

Code optimization conversations may be updated in various ways. In some embodiments, the code optimization conversations may be updated through periodic aging or invalidation. In some embodiments, a connected MRTE may also send a request to the code optimization service for the most updated code optimization conversations even when cache matches are satisfied. In some embodiments, the code optimization service may initiate or "push" the publication of new information to the caches at different levels and tiers.

As shown above, a connected MRTE has many benefits. A connected MRTE provides better performance, in terms of execution speed, efficiency, and cost. A connected MRTE has improved startup behavior. A connected MRTE can reduce CPU costs, startup/teardown cost, power drain, and other resource consumption.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of providing an optimized version of a code unit to a managed runtime environment on a device by a code optimization service, comprising:

obtaining information related to one or more runtime conditions associated with the managed runtime environment that is executing in a different process than that of the code optimization service, and wherein the one or more runtime conditions are subject to change during the execution of the code unit, wherein obtaining the information related to the one or more runtime conditions comprises:

conducting a code optimization conversation between the code optimization service and the managed runtime environment, and wherein the code optimization conversation comprises one or more iterations, and wherein an iteration in the one or more iterations comprises a question and an answer, and wherein the question and the answer are related to at least one of the one or more runtime conditions associated with the managed runtime environment; and providing to the managed runtime environment the optimized version of the code unit and a corresponding set of one or more speculative assumptions, wherein the optimized version of the code unit produces the same logical results as the code unit unless at least one of the set of one or more speculative assumptions is not true, and wherein the set of one or more speculative assumptions are based on the information related to the one or more runtime conditions; and wherein the code optimization conversation is stored in a code optimization query cache, wherein the code optimization conversation is replayable to the managed runtime environment or another different managed runtime environment, wherein replaying of the code optimization conversation comprises:

conducting the code optimization conversation between the code optimization query cache and the managed runtime environment or the another different managed runtime environment; and providing by the code optimization query cache an optimized version of the code unit and a corresponding set of one or more speculative assumptions to the managed runtime environment or the another different managed runtime environment.

2. The method of claim 1, wherein the question is posed by the code optimization service, and wherein the answer is provided by the managed runtime environment.

3. The method of claim 1, wherein the code optimization conversation comprises two or more iterations, and wherein in between two of the two or more iterations, the code optimization conversation is paused for a period of time, and wherein the code optimization conversation is subsequently resumed with another iteration.

4. The method of claim 1, further comprising:
after one iteration, determining whether a different version of optimized code of the code unit is derived based on the information obtained from the answer of the iteration.

5. The method of claim 4, wherein in the event that there is a different version of optimized code of the code unit, the method further comprising:
providing the different version of optimized code of the code unit to the managed runtime environment, and wherein the managed runtime environment replaces a currently running version of the code unit with the different version of optimized code of the code unit.

6. The method of claim 4, wherein in the event that there is not a different version of optimized code of the code unit, the method further comprising:
notifying the managed runtime environment that a different version of optimized code of the code unit is not available.

7. The method of claim 4, wherein the code optimization query cache is located locally on the device or remotely from the device in a cloud storage.

8. The method of claim 7, wherein the stored code optimization conversation is stored as a tree data structure, and wherein the tree data structure comprises one or more of the following: node or state transition information, the questions in the one or more iterations, and the different versions of optimized code of the code unit associated with each node.

9. The method of claim 1, wherein a runtime condition comprises a field or method of an object or a class associated with the code unit.

10. The method of claim 1, wherein the code optimization service comprises a code optimizer, and wherein the code optimizer is executing in a different process than that of the managed runtime environment.

11. A code optimization service for providing an optimized version of a code unit to a managed runtime environment on a device, comprising:
a processor; and
a memory coupled with the processor, wherein the memory is configured to provide the processor with instructions which when executed cause the processor to:
obtain information related to one or more runtime conditions associated with the managed runtime environment that is executing in a different process than that of the code optimization service, and wherein the one or more runtime conditions are subject to change during the execution of the code unit, wherein obtaining the information related to the one or more runtime conditions comprises:
conducting a code optimization conversation between the code optimization service and the managed runtime environment, and wherein the code optimization conversation comprises one or more iterations, and wherein an iteration in the one or more iterations comprises a question and an answer, and wherein the question and the answer are related to at least one of the one or more runtime conditions associated with the managed runtime environment; and
provide to the managed runtime environment the optimized version of the code unit and a corresponding set of one or more speculative assumptions, wherein the optimized version of the code unit produces the same logical results as the code unit unless at least one of the set of one or more speculative assumptions is not true, and wherein the set of one or more speculative assumptions are based on the information related to the one or more runtime conditions; and
wherein the code optimization conversation is stored in a code optimization query cache, wherein the code optimization conversation is replayable to the managed runtime environment or another different managed runtime environment, wherein replaying of the code optimization conversation comprises:
conducting the code optimization conversation between the code optimization query cache and the managed runtime environment or the another different managed runtime environment; and
providing by the code optimization query cache an optimized version of the code unit and a corresponding set of one or more speculative assumptions to the managed runtime environment or the another different managed runtime environment.

12. The code optimization service of claim 11, wherein the question is posed by the code optimization service, and wherein the answer is provided by the managed runtime environment.

13. The code optimization service of claim 11, wherein the code optimization conversation comprises two or more iterations, and wherein in between two of the two or more iterations, the code optimization conversation is paused for a period of time, and wherein the code optimization conversation is subsequently resumed with another iteration.

14. The code optimization service of claim 11, wherein the memory is further configured to provide the processor with instructions which when executed cause the processor to:
after one iteration, determine whether a different version of optimized code of the code unit is derived based on the information obtained from the answer of the iteration.

15. The code optimization service of claim 14, wherein in the event that there is a different version of optimized code of the code unit, wherein the memory is further configured to provide the processor with instructions which when executed cause the processor to:
provide the different version of optimized code of the code unit to the managed runtime environment, and wherein the managed runtime environment replaces a currently running version of the code unit with the different version of optimized code of the code unit.

16. The code optimization service of claim 14, wherein in the event that there is not a different version of optimized code of the code unit, wherein the memory is further configured to provide the processor with instructions which when executed cause the processor to:
notify the managed runtime environment that a different version of optimized code of the code unit is not available.

17. The code optimization service of claim 14, wherein the code optimization query cache is located locally on the device or remotely from the device in a cloud storage.

18. The code optimization service of claim 17, wherein the stored code optimization conversation is stored as a tree data structure, and wherein the tree data structure comprises one or more of the following: node or state transition information, the questions in the one or more iterations, and the different versions of optimized code of the code unit associated with each node.

19. The code optimization service of claim 11, wherein a runtime condition comprises a field or method of an object or a class associated with the code unit.

20. The code optimization service of claim 11, wherein the code optimization service comprises a code optimizer, and wherein the code optimizer is executing in a different process than that of the managed runtime environment.

21. A computer program product for providing an optimized version of a code unit to a managed runtime environment on a device, the computer program product being embodied in a tangible computer readable storage medium and comprising computer instructions for:

obtaining information related to one or more runtime conditions associated with the managed runtime environment that is executing in a different process than that of the code optimization service, and wherein the one or more runtime conditions are subject to change during the execution of the code unit, wherein obtaining the information related to the one or more runtime conditions comprises:

conducting a code optimization conversation between the code optimization service and the managed runtime environment, and wherein the code optimization conversation comprises one or more iterations, and wherein an iteration in the one or more iterations comprises a question and an answer, and wherein the question and the answer are related to at least one of the one or more runtime conditions associated with the managed runtime environment; and providing to the managed runtime environment the optimized version of the code unit and a corresponding set of one or more speculative assumptions, wherein the optimized version of the code unit produces the same logical results as the code unit unless at least one of the set of one or more speculative assumptions is not true, and wherein the set of one or more speculative assumptions are based on the information related to the one or more runtime conditions; and wherein the code optimization conversation is stored in a code optimization query cache, wherein the code optimization conversation is replayable to the managed runtime environment or another different managed runtime environment, wherein replaying of the code optimization conversation comprises:

conducting the code optimization conversation between the code optimization query cache and the managed runtime environment or the another different managed runtime environment; and providing by the code optimization query cache an optimized version of the code unit and a corresponding set of one or more speculative assumptions to the managed runtime environment or the another different managed runtime environment.

* * * * *